United States Patent [19]

Gordon

[11] Patent Number: 4,510,566
[45] Date of Patent: Apr. 9, 1985

[54] MACHINE TOOL READOUT WITH AUTOMATIC CUTTER RADIUS OFFSET

[76] Inventor: Gary B. Gordon, 21112 Bank Mill Rd., Saratoga, Calif. 95070

[21] Appl. No.: 424,390

[22] Filed: Sep. 27, 1982

[51] Int. Cl.³ .............................................. G06F 15/46
[52] U.S. Cl. .................................. 364/190; 364/170; 364/474; 318/572; 408/13; 340/679; 340/680; 73/660
[58] Field of Search .............. 364/170, 190, 474, 475; 318/572; 408/13, 16; 340/679, 680; 73/660

[56] References Cited

U.S. PATENT DOCUMENTS

| | | | |
|---|---|---|---|
| 3,866,027 | 2/1975 | Cutler et al. | 318/572 |
| 4,162,527 | 7/1979 | Kilbane et al. | 364/170 X |
| 4,294,162 | 10/1981 | Fowler et al. | 364/190 X |
| 4,330,831 | 5/1982 | Schwefel | 364/170 X |

Primary Examiner—Joseph F. Ruggiero
Assistant Examiner—Allen MacDonald

[57] ABSTRACT

In an improved digital readout for machine tools, an apparatus is provided which automatically offsets the digital position display by the radius of the cutting tool. A machinist is thereby enabled to work more rapidly and with reduced chance of making errors.

4 Claims, 3 Drawing Figures

MACHINE TOOL READOUT WITH AUTOMATIC CUTTER RADIUS OFFSET

BACKGROUND OF THE INVENTION

It is increasingly common with machine tools to include electronic devices which measure and digitally display the machine's coordinates, independent of the lead screw dials. Such devices increase productivity, since they are easy to read and are not subject to inaccuracies from machine wear.

They typically consist of several axes of optical or magnetic distance scales coupled to a common display box. The display in turn typically contains a keypad for entering preset distances, along with several channels of digital readout for displaying the current coordinates of the cutting tool, and a processor. The processor accumulates pulses from the scales, and provides such functions as English-to-metric units conversion. Representative of these devices is the apparatus described in U.S. Pat. No. 3,872,288.

Even with these devices, however, some arithmetic drudgery is necessary on the part of the machinist. This comes about because his display shows the coordinates of the center of his cutter, whereas the cutting is done by its periphery. The part drawings he works from specify the coordinates of the final cuts, which he then must convert to cutter centerline coordinates by adding in or subtracting out the radius of the cutter.

For example, to start a rectangular cutout in his workpiece at X=1.960 inches, with a 0.250 inch diameter end-mill, the machinist first sets his machine to a calculated X coordinate of 1.960+0.250/2=2.085 inches. Completing the cutout involves repeating similar computations three more times: a second addition to compute the Y coordinate, followed by a first and second subtraction to compute the X and Y coordinates of the opposite sides of the cutout.

It is not uncommon for one workpiece to require many dozen such calculations. Besides the time expended, there is always the risk of incurring a mathematical error, which could likely ruin the part.

Some digital coordinate readouts partially solve this problem for the machinest by mechanizing the mathematics, if not the decision making function. Typically they contain a register into which the machinist makes a one-time entry of the cutter radius. One such product is the Bausch & Lomb ACCU-RITE TM. With it, control keys are provided which allow the cutter radius to be either added to or subtracted from the X or Y coordinates, at the manual direction of the machinest.

In practice this feature is seldom used, because it does not solve the total problem, and trades one set of problems for another. The operator must now divide his attention while machining, continually making offset-direction decisions, and reaching each time for the appropriate key.

SUMMARY OF THE INVENTION

In the present invention, the digital coordinate readout unit appears outwardly much the same as a conventional readout with cutter radius offset provisions. The cutter radius or diameter is entered in the usual manner, and subsequently shown on a dedicated or shared display. The difference is that the appropriate direction of cutter radius offset is automatically derived, and the cutter radius offset then automatically combined into the displayed coordinates, without operator intervention.

The decision as to whether to add or subtract the cutter radius is made algorithmically. It is based solely on knowledge of the present and recent positions of the machine tool, data which is electronically available to the digital readout.

This data is first used to determine which direction in X and which direction in Y the cutter is traveling. This knowledge is sufficient to decide the appropriate cutter radius offset directions, since with proper machining techniques the cutter is always advanced toward the workpiece in each axes of travel. Thus, if a particular coordinate is increasing, the offset is added to that coordinate before it is displayed. If it is decreasing, the offset is subtracted. This process is continually repeated in all axes of interest.

One desirable element of this improved readout is hysteresis in the decision algorithm. Vibration is present in every machine tool, and often causes jitter in the least significant digit of the display. To prevent this jitter from being interpreted as legitimate travel, the offset direction should only be changed for changes in cutter position that are significant. For a typical milling machine with readout resolution of 0.001", a significant position change might be chosen as motion of 0.020" or more. Hysteresis allows effective functioning of the automatic offset process without false triggering due to vibration.

DESCRIPTION OF THE PREFERRED EMBODIMENT

Figure 1:
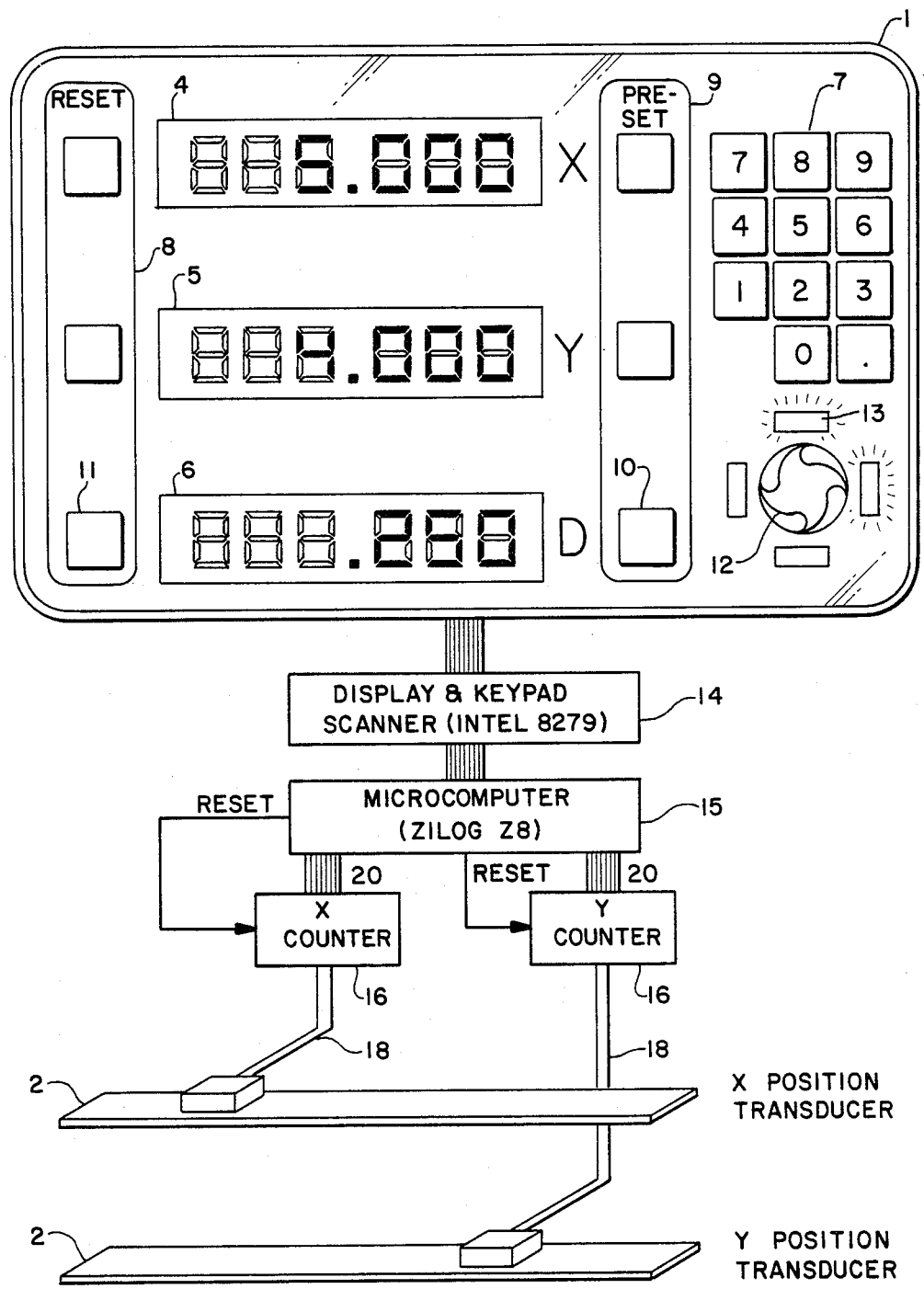
FIG. 1 is a block diagram showing the display and other major elements of a microcomputer implementation of the present invention.

Referring now to FIG. 1, there is shown the major blocks of a microprocessor-controlled embodiment of the present invention. Physically it comprises three assemblies; the two position transducers 2, and a display box housing the control panel 1 and the remainder of the blocks.

All operator interaction is via the control panel 1's various displays and keys. Displays 4, 5, 6 are used to show the X and Y positions of the cutter, as well as the cutter diameter or radius. Reset buttons 8 are provided to zero any of the displays. Preset push-switches 9 are used in conjunction with keypad 7 to enter either coordinates or the cutter diameter into the displays. For example, the data shown in the cutter diameter display 6 was entered by pressing the diameter preset push-switch 10, followed by pressing ., 2, 5, and 0 on the keypad 7. If no cutter diameter compensation is desired, the diameter display 6 could be cleared with its reset push-switch 11.

The status of the automatic radius compensation algorithm is displayed on a cluster comprising a cutter symbol 12 and four bar-shaped annunciators 13. The bar annunciators depict the workpiece. At any time, two bars will be illuminated, and the two bars will always be adjacent to one another.

The display 1 is interfaced to the microcomputer 15 by a standard display and keyboard scanner integrated circuit 14. One of its functions is to monitor all of the push-switches 7, 8, 9 and alert the microprocessor when any are depressed. For compatibility with this design approach, all of the push switches are of the simple SPST momentary-contact type.

A second function of the scanner 14 is to accept data for display from the microcomputer 15, hold it in internal memory, and scan it into the displays 4, 5, 6 and annunciators 13. For compatibility again with this design approach, the seven-segment displays and annunciators are of the light-emitting diode type.

The unprocessed position data for the cutter is measured by transducers 2 which are clamped to the movable carriages of the machine tool. Such transducers are typically optical in their principle of operation and based on Moiré fringe sensing. A representative manufacturer is Bausch & Lomb, offering models with 0.0005 inch and 0.0001 inch resolution. Such scale assemblies typically output either quadrature square-wave signals or up-and-down pulses 18.

These pulses are accumulated in conventional digital counters 16, which store the cutter centerline coordinates and make them available to the microcomputer 25.

The microcomputer interfaces this coordinate data to the display scanner 14, and provides overall control and data manipulation functions. It is of the one chip type, such as Zilog Z8. When used in a conventional readout, the microcomputer often provides such functions (not shown here) as English-to-metric units conversion.

Figure 2:
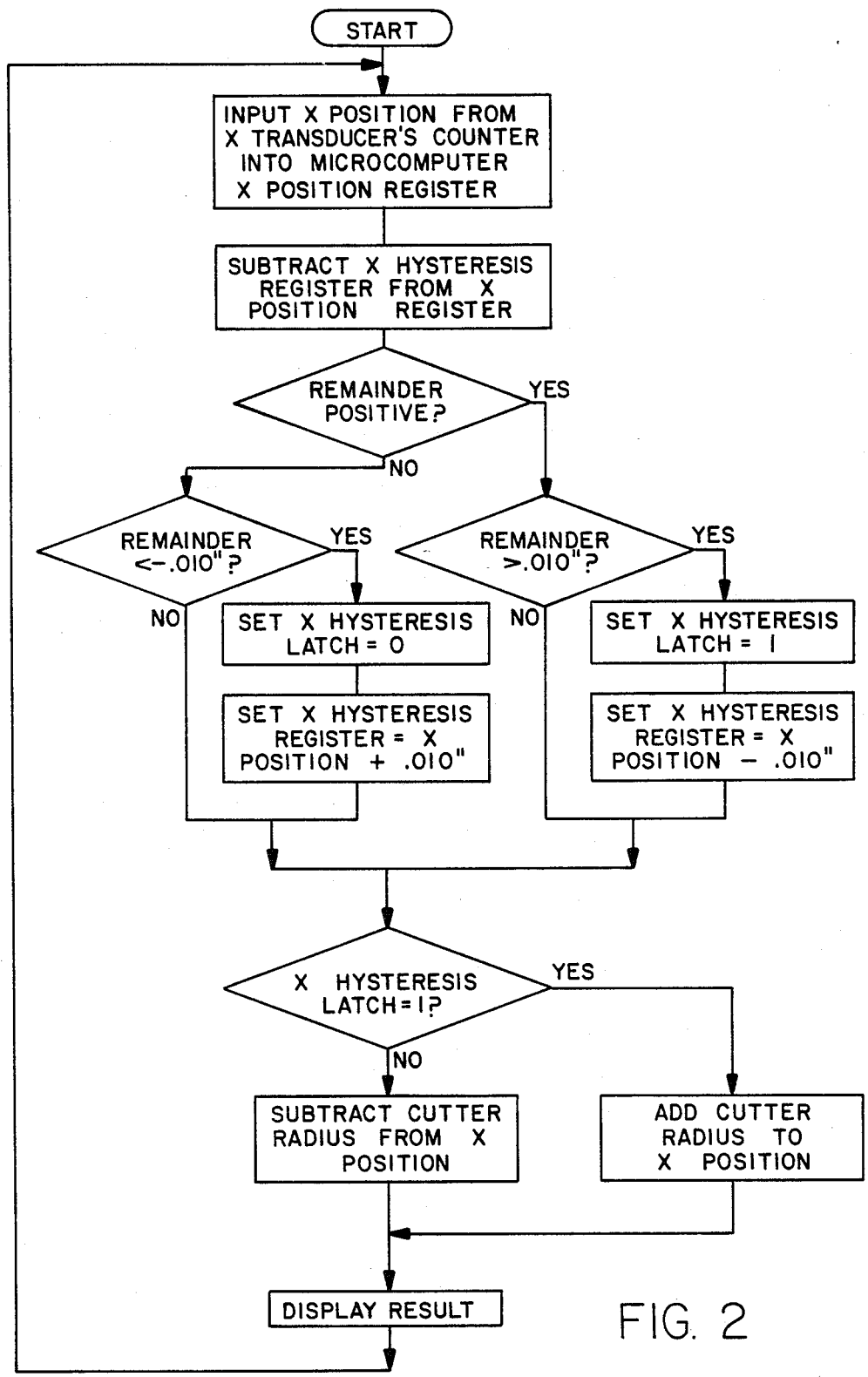
FIG. 2 is a flow chart of the apparatus of FIG. 1.

In this embodiment of the present invention the microcomputer 15 also performs the decision function as to whether to add or subtract the cutter radius offset. To accomplish this, it must first determine which way the cutter is moving, and apply appropriate hysteresis. This is accomplished by executing the flow chart shown in FIG. 2, for each axis, on a repetitive basis, for example in accordance with the program set forth in Appendix A.

Figure 3:
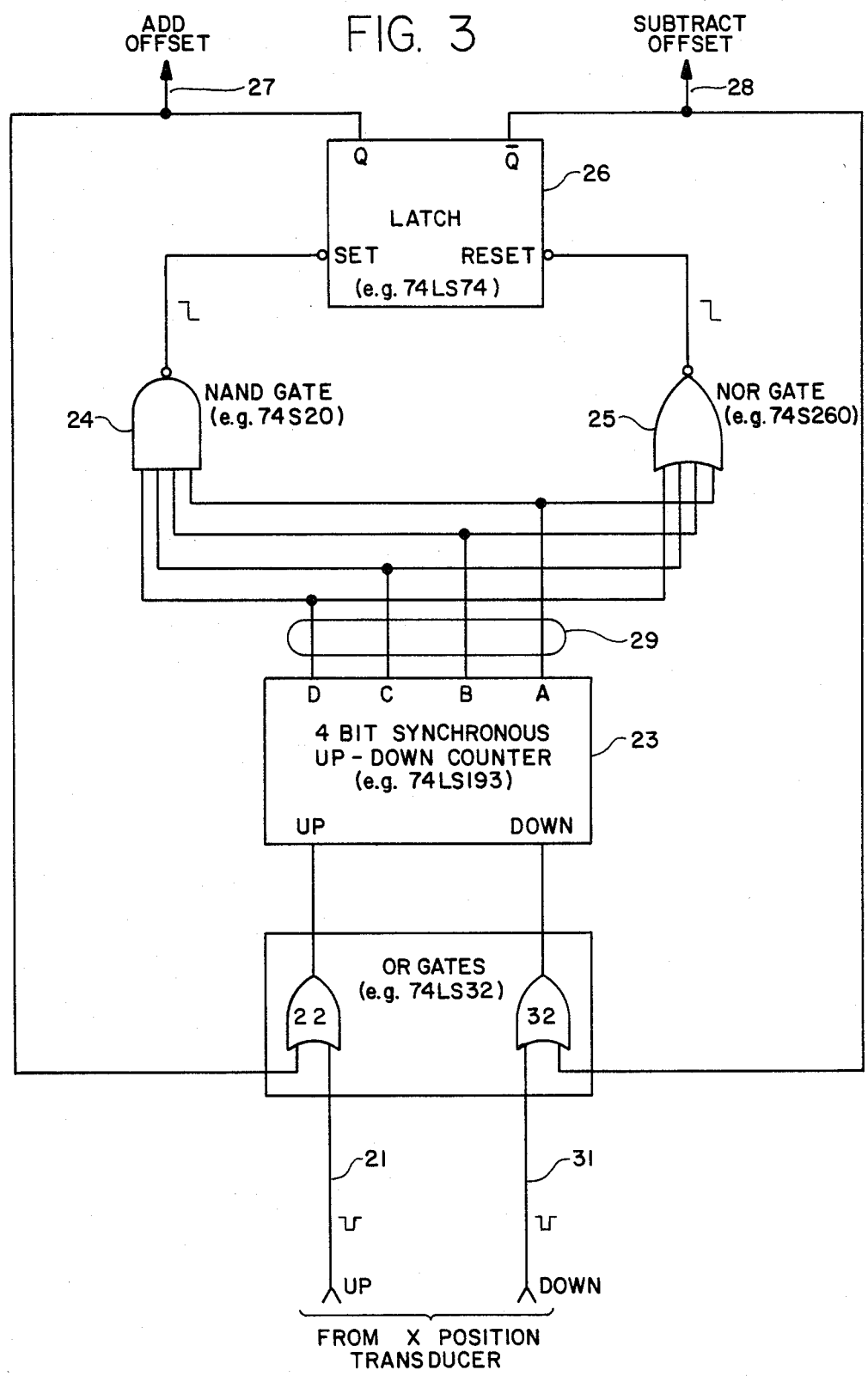
FIG. 3 is a detailed schematic drawing of a hard-wired logic implementation of the decision-making function of the present invention.

Referring now to FIG. 3, there is shown a hard-wired logic implementation of the decision-making function; again, for one axis only. Such an embodiment could easily be added to a conventional machine tool digital readout which offered only manual control of cutter radius offset. It outputs digital signals 20 which could be used to activate the offset push buttons automatically.

In its operation, up and down position pulses 21, 31 are first passed through gates 22, 32 to a four-bit up-down counter 23. The counter's purpose is to add hysteresis to the direction-determining function, by requiring 16 up or down pulses to be received before the cutter offset direction commands 27, 28 are reversed. When the counter reaches state 15 all its outputs 29 are high. This condition is sensed by a NAND gate 24, which in turn sets the offset direction latch 26. This latch sets the add-offset line 27 high, and disables the counter 23 from receiving more up pulses 24 by inhibiting gate 22.

Similarly after a string of down pulses 31, the counter 23 reaches state 0 whereupon its outputs 25 are all low. This condition is sensed by NOR gate 25, which in turn resets the offset direction latch 26, and inhibits the counter 23 from receiving further down pulses via gate 32. Other methods of implementing the automatic offset function include using state machines and custom integrated circuits.

Consider now an example of the operation of milling an interior detail, a 1" by 3" rectangular cutout in a metal plate, using a 0.250 inch diameter end mill cutter.

Assume that the lower left-hand corner of the plate is assigned the reference coordinates $X=0.000''$, $Y=0.000''$. For this example, let the intended cutout extend horizontally from $X=2.000''$ to $X=5.000''$, and vertically from $Y=3.000''$ to $Y=4.000''$.

The machinist starts the operation by lowering the cutter through the plate somewhere inside the perimeter of the intended cutout. He next advances the cutter sideways toward any one edge of the cutout, with the intent of stopping the cutter at its perimeter.

Assume that he chooses to first move the cutter upwards, in the direction of an increasing Y coordinate. According to the algorithm of the present invention, since the coordinate is increasing, the offset is added. Thus as the center of the cutter passes $Y=3.5000''$, for example, 3.625" is actually displayed, which is the coordinate of the cutting edge. For the intended cut he continues until the display reads $Y=4.000''$. At this point the upper (and cutting) edge of the cutter has reached 4.000", although the cutter centerline is only at $Y=3.875''$.

Assume next that he chooses to advance the cutter to the right, cutting the top portion of the cutout from the present cutter position over to the upper right-hand corner. As the cutter starts to advance, its X coordinate will increase. In accordance with the aforementioned algorithm the offset is now continually added to X, as well as still being continually added to Y.

The machinist proceeds to cut toward the right, much as before, stopping when his display reads $X=5.000''$. At this point the display indicates $X=5.000''$, $Y=4.000''$, the two cutting coordinates. The center of the cutter is of course at $X=4.875''$, $Y=3.875''$.

His next operation is to cut downwards toward the lower right-hand corner, as he proceeds to mill clockwise around the cutout. Here the digital readout senses a decreasing Y coordinate, and therefore according to the algorithm subtracts the cutter radius from the displayed coordinate. Thus as he reaches his next corner the Y display shows $Y=2.000''$, the lower or cutting coordinate, while the cutter center is of course at $Y=2.125''$.

As the machinist proceeds with these cuts, it is seen that he moves the machine tool to displayed coordinates that correspond exactly to those on his part drawing. He has neither to compute cutter-center coordinates, nor to decide which direction the offset should be in, and then press appropriate buttons.

The present improved digital readout handles the cutting of external details as well, for example the milling of the aforementioned metal plate to a rectangular overall size of 6" by 7". There is a procedure required however in this application. Were the cutter to be simply moved around the perimeter in four simple moves, the offset would be applied in the wrong direction. This is, however, neither proper nor normal machining practice. With each and every cut the backlash of the lead screw should first be taken out so that the table does not subsequently creep away from the cutter under its cutting pressure.

The proper backlash removal procedure on an external cut it to first overshoot the corner slightly when completing the machining of the previous side of the workpiece. Next the cutter is brought back toward the workpiece, retracing its most recent motion, until it reaches the coordinate for starting the cut on the next side. This brief and conventional retrace step always advances the cutter toward the workpiece, insuring proper operation of the automatic digital readout.

The foregoing description has been based on using a common end-mill cutter. The operation is similar for other cutters such as for example corner-rounding end-mills and arbor-mounted saws, and also for edge finders.

APPENDIX A

```
10   Offsetx: !AUTOMATIC-OFFSET SUBROUTINE
20   ENTER Xtransducer:Xposition
30   Test = Xposition − Xhysteresis
40   IF Test > .010 THEN
50     Xlatch = 1
60     Xhysteresis = Xposition − .010
70   END IF
80   IF Test < −.010 THEN
90     Xlatch = 0
100    Xhysteresis = Xposition + .010
110  END IF
120  IF Xlatch = 1 THEN
130    Xdisplay = Xposition + Radius
140  ELSE
150    Xdisplay = Xposition − Radius
160  END IF
170  RETURN
```

I claim:

1. Machine-tool digital position readout apparatus with automatic offset to compensate for a radius of a cutter moving relative to a workpiece, the apparatus comprising:

position-sensing means for determining a position of the centerline of the cutter;

input means for entering the size of the cutter;

direction-sensing means for sensing the direction of the motion of the cutter;

automatic-decision means responsive to the direction-sensing means for assigning a sign to the cutter radius depending on the sensed direction of motion, and for arithmetically combining the signed cutter radius with the position of the centerline of the cutter, to produce offset coordinates; and display means for displaying the offset coordinates.

2. Position readout apparatus as in claim 1 wherein said direction-sensing means includes hysteresis means which inhibits the decision means unless the motion exceeds a predetermined value.

3. Position readout apparatus as in claim 1 wherein said direction-sensing means is responsive to said position-sensing means.

4. Position readout apparatus as in claim 1 wherein said automatic decision means assigns a positive offset if the position of the cutter relative to the workpiece is becoming increasingly positive, and a negative offset if the position is becoming increasingly negative; and adds the signed offset to the cutter centerline position.

* * * * *